No. 873,988.
PATENTED DEC. 17, 1907.
R. CHASSÉ.
ANIMAL TRAP.
APPLICATION FILED JULY 3, 1907.
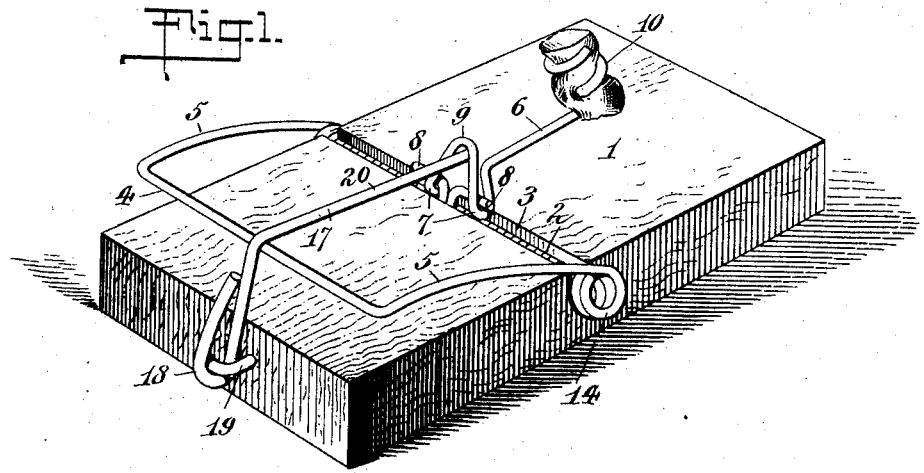
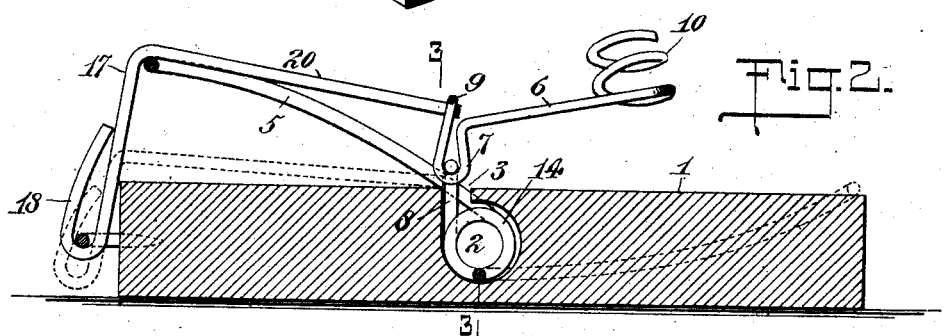
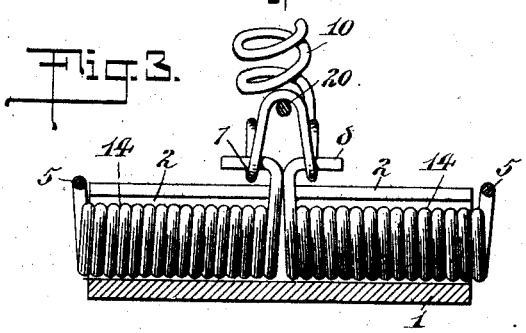
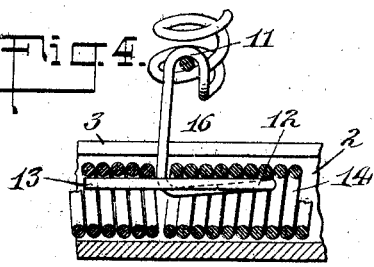
WITNESSES
M. Van Nortwick
John B. White
INVENTOR
Raphael Chassé
BY
George Cook
ATTORNEY

UNITED STATES PATENT OFFICE.

RAPHAEL CHASSÉ, OF MIDDLETOWN, NEW YORK, ASSIGNOR TO CHASSE MANUFACTURING COMPANY, OF MIDDLETOWN, NEW YORK, A CORPORATION OF NEW YORK.

ANIMAL-TRAP.

No. 873,988.   Specification of Letters Patent.   Patented Dec. 17, 1907.

Application filed July 3, 1907. Serial No. 382,000.

*To all whom it may concern:*

Be it known that I, RAPHAEL CHASSÉ, a citizen of the United States, and a resident of Middletown, in the county of Orange and State of New York, have made and invented certain new and useful Improvements in Animal-Traps, of which the following is a specification.

My invention relates to an improvement in animal traps, the object being to provide a trap which may be easily and readily set and which will be extremely sensitive to any movement of the baiting member.

A further object is to provide a trap which will be economical in construction and which will consist of but few parts.

With this and other objects in view, the invention consists in certain novel features of construction and combinations of parts, as will be hereinafter fully described and pointed out in the claims.

In the accompanying drawings, Figure 1 is a perspective view of my trap in its set position. Fig. 2 is a longitudinal sectional view of the same, the dotted lines indicating the position of the parts after the trap has been sprung. Fig. 3 is a transverse sectional view, and Fig. 4 is a view similar to Fig. 3, showing a modified form of the baiting member.

Referring to the drawings 1 represents the base or body of the trap, preferably made of wood and having a recess or opening 2 formed therein, said recess being preferably cylindrical in form and communicating with a slot 3 formed in the upper surface of the base, as shown in Fig. 2.

The spring member is constructed of wire of sufficient thickness to impart the desired strength thereto, said wire being bent to form a transverse or central portion 4, the length of which is substantially the same as the width of the base 1, and arms or end portions 5. The ends of the wire are formed into coils 14 which extend inwardly from the arms or end portions and approximately at right angles thereto, said coils being seated in, and inclosed by, the cylindrical recess 2, and having their extreme inner ends 8 extending upwardly through the slot 3, and then bent outwardly substantially parallel with the upper surface of the base, as shown in Figs. 1, 2 and 3. The arms 5 are of such length, as compared to the base, that the central portion 4 will rest upon the upper surface of said base when the trap is in its sprung position, as shown in dotted lines in Fig. 2.

The baiting member or trigger 6, is preferably made from a single piece of wire of suitable strength and is bent at its inner end to form loops or eyes 7, which are adapted to loosely embrace the outwardly bent end portions 8 whereby the trigger is held in position, and the upwardly extending loop 9 which is adapted to engage the end of the tripping arm when the trap is set, said loop 9 being preferably given a slight forward inclination. At the other end of the baiting arm the free end of the wire is formed into a helix or spiral 10, upon which the bait is adapted to be fastened by imparting a screw-like motion thereto, whereby the wire will be forced into the bait, firmly holding it in position, so that it cannot be displaced or removed without moving the baiting arm and thereby springing the trap.

The tripping arm 17 is formed from comparatively heavy wire in order that it may retain the spring member in its set position without bending, and is attached to the base in any suitable manner. As shown in the figures, I form a loop or eye 18 at one end of said arm with which loosely engages a staple or similar fastening device 19, which is driven into the base at one end thereof. Said arm has a straight portion 20 adapted to extend forwardly above the base, the length of which is such that its extreme outer end will engage with the under side of the loop 9 of the baiting member 6 to retain the parts of the trap in their operative or set positions, but will allow the trap to be sprung upon the slightest movement of the baiting arm.

In Fig. 4, I have shown a slightly modified form of the baiting member in which the eyes or loops 7 are dispensed with. In this modification the wire 16, forming one side of the upwardly extending loop 11, is extended downwardly a suitable distance and bent at a right angle, and then bent back upon itself forming the loop 12, the free end 13 of the wire extending beyond the downwardly extending portion a suitable distance as shown in Fig. 4. This form of baiting arm is held in position by inserting the portions 12 and 13 in the openings at the inner ends of the coils 14, the portion 16 extending upwardly between the ends of said coils and through the slot 3, as shown in Fig. 4.

The setting and operation of the trap will now be described: After the bait has been secured to the helix or spiral 10 in the manner described, the spring member is forced backward and the tripping arm is then placed in position, the central portion 4 of the spring member engaging with the under side of the straight portion 20 of said arm, the extreme forward end of which engages with the under side of the loop 9 of the baiting member 6, as shown in Figs. 1 and 2. The parts remain in this position owing to the pressure which the spring member exerts upon the tripping arm, whereby its end is held firmly against the under surface of the loop 9. If, now, an animal attempts to eat or remove the bait, the baiting member will be moved sufficiently to release the tripping arm, whereupon the spring member will be allowed to spring forward and the animal will be caught and firmly held between the spring member and the base of the trap.

It will be seen that I have designed a trap which is extremely simple in its operation, which is inexpensive to manufacture, which will be quick to respond to the slightest movement of the baiting member, and which will be positive in its action.

Having fully described my invention, what I claim as new and desire to secure by Letters Patent, is:—

1. In an animal trap, the combination with a base provided with an opening extending through the same and a slot in the upper surface of said base communicating therewith, of a spring member having coiled ends contained within said opening, a baiting member, one end of which is adapted to retain the bait and the opposite end loosely connected with the coiled ends of said spring member, and a tripping arm pivoted to one end of said base and adapted to engage with the baiting member, substantially as described.

2. In an animal trap, the combination with a base provided with an opening extending through the same and a slot in the upper surface of said base communicating therewith, of a spring member having coiled spring ends contained within said opening, the extreme ends extending upwardly through said slot and bent outwardly to form supporting arms, a baiting member, one end of which is adapted to receive the bait and the opposite end engaging with the outwardly bent ends of said spring member and formed with an upwardly extending loop, and a tripping arm pivoted at one end to the base the opposite end adapted to engage with the loop on said baiting member, substantially as described.

Signed at New York, borough of Manhattan, in the county of New York, and State of New York, this 1st day of July, A. D. 1907.

RAPHAEL CHASSÉ.

Witnesses:
M. VAN NORTWICK,
WM. P. JONES.